United States Patent Office 2,765,317
Patented Oct. 2, 1956

2,765,317

BIS (2-AMINOALKYL-COUMARAN) DERIVATIVES AND INTERMEDIATES

Albert Funke, Paris, France, assignor to Societe des Usines Chimiques Rhone-Poulenc, Paris, France, a corporation of France No Drawing. Application November 23, 1953,
Serial No. 393,952

Claims priority, application France November 28, 1952

9 Claims. (Cl. 260—294.7)

This invention relates to new and useful coumaran derivatives.

It is a principal object of this invention to provide new coumaran derivatives having valuable therapeutic properties. A further object is to provide new coumaran derivatives constituting valuable intermediates for the production of therapeutic agents.

The new therapeutically useful coumaran derivatives of the present invention are the compounds conforming to the general formula:

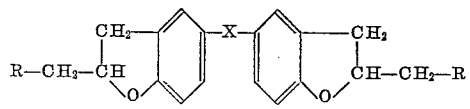

and the salts of those compounds, wherein X represents a member of the class consisting of a simple linkage and the following bivalent atoms and groups: O, S, —CH$_2$— and CO, R being a tertiary amine radical selected from piperidino and morpholino.

The invention includes within its scope useful intermediates for conversion into compounds of general formula I and like compounds of therapeutic interest, which intermediates are represented by general formula I with the group R replaced by a halogen atom.

The aforesaid intermediates may, according to a feature of this invention, be prepared by tetrahalogenation of compounds of the type:

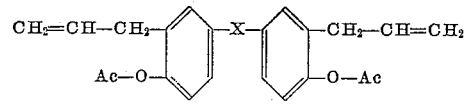

wherein Ac represent an acyl group and treatment of the bis(dihalopropyl) derivatives thus obtained with an alkaline agent which hydrolyses the acyloxy group or groups and simultaneously effects the closing of the dihydrofuran rings to form the required halomethyl coumarans. On treatment with piperidine or morpholine in the presence of an acid binding agent (which may comprise an excess of the secondary amine) the said halomethyl coumarans form aminomethyl-coumarans of general formula I with loss of hydrohalic acid; the reaction may be followed by conversion, if desired, into salts by reaction with an appropriate acid.

The products of general formula I possess, to degrees varying in accordance with the individual chemical substances, cardiac, analgesic and cholinesterasic properties of value in human and veterinary therapy.

The following examples illustrate the invention.

Example I

3:3'-diallyl-4:4'-diacetoxy-diphenyl (10 g.), obtained by acetylation of 3:3'-diallyl-4:4'-dihydroxy-diphenyl (prepared in accordance with United States Patent No. 2,227,805), is dissolved in carbon disulphide (120 cc.), and then bromine (9.15 g.) is gradually added, with agitation, while the temperature is maintained below 0° C. The precipitate, 3:3'-bis(dibromopropyl)-4:4'-diacetoxy-diphenyl, is separated by filtration, and, after recrystallisation from absolute alcohol, melts at 156–157° C.

A suspension of 3:3'-bis(dibromopropyl)-4:4'-diacetoxy-diphenyl (15 g.) in absolute alcohol (400 cc.) is then formed, and, while heating the suspension on a water bath, a 2% sodium solution in absolute alcohol (50 cc.) is gradually added. On completion of the reaction, the alcohol is driven off and the residue is taken up in chloroform. The chloroform solution is washed and dried, and the greater part of the chloroform is removed by distillation. An excess of absolute alcohol is added to the residue, and bis(2-bromomethyl-5-coumaranyl) is precipitated, which, after recrystallisation from a mixture of chloroform and alcohol, melts at 125–126° C.

The product thus obtained (5.54 g.) is heated for 10 hours at 140° C. in a sealed tube with a solution of piperidine (7.8 cc.) in benzene (15 cc.). After cooling, precipitated piperidine hydrobromine is filtered off; the benzene solution is treated with dilute hydrochloric acid and the hydrochloric acid solution thus obtained is made alkaline. The reaction product is extracted with ether, and the ethereal solution is washed and dried. After removal of the ether by distillation, bis(2-piperidinomethyl-5-coumaranyl) remains as residue. It melts at 132–133° C. after recrystallisation from alcohol, and its dihydrochloride melts at 300–310° C. with decomposition.

Example II

Bromine (27.9 g.) is gradually added to a solution, cooled to —5° C., of bis(4-acetoxy-3-allyl-phenyl) ether (32 g.) in carbon disulphide (240 cc.). A white crystalline precipitate of bis(4-acetoxy-3-dibromopropyl-phenyl) ether, which melts at 119–123° C., is formed and is filtered off when the reaction is completed. A further small quantity of the tetrabromo ether may be recovered by concentration of the mother liquor.

A solution of sodium (0.95 g.) in absolute alcohol (20 cc.) is added in small portions, with heating, to a suspension of the tetrabromo ether (14 g.) in absolute alcohol (170 cc.). The solution obtained is boiled under reflux for one hour, after which the alcohol is removed by distillation. The residue is taken up in chloroform, and, after filtering off the sodium bromide present, the chloroform is driven off. The residue is bis(2-bromomethyl-5-coumaranyl) ether, which melts at 118–119° C. after recrystallisation from a mixture of chloroform and alcohol.

Bis(2-bromomethyl-5-coumaranyl) ether (4.4 g.), piperidine (6 g.), benzene (15 cc.) are heated together in a sealed tube at 130° C. for 16 hours. After cooling, the piperidine hydrobromine formed is filtered off and the benzene solution is treated with a solution of hydrochloric acid. The resultant solution is made alkaline, and the precipitated base is extracted with ether. After evaporation of the ether, the base is obtained in the form of a brown amorphous mass which is then dissolved in a mixture of petroleum ether and benzene and purified by chromatography using alumina. Bis(2-piperidinomethyl-5-coumaranyl) ether is thus obtained in the form of an oil. Its hydrochloride melts at 235–238° C., with decomposition, after recrystallisation from a mixture of alcohol, acetone and ether.

Example III

By proceeding as in Example II, bis(4-acetoxy-3-dibromopropyl-phenyl)-methane is prepared from bis(4-acetoxy-3-allyl-phenyl)-methane and is thereafter converted into bis(2-bromomethyl-5-coumaranyl)-methane, which forms crystals melting at 84–85° C. after purification of a solution in benzene by chromatography using alumina.

The bis(2-bromomethyl-5-coumaranyl)-methane is converted into bis(2-piperidinomethyl-5-coumaranyl)-methane by following the same procedure as in the preceding example, but instead effecting the reaction with piperidine at 110° C. only. The product, after purification by chromatography using alumina, forms a yellowish oil which gives, with an ethereal hydrochloric acid solution, a hydrochloride which forms colourless crystals melting at about 165° C. after recrystallisation from a mixture of acetone, water and ether.

*Example IV*

Bis(4-acetoxy-3-allyl-phenyl) ketone (13 g.), prepared by acetylation of bis(4-hydroxy-3-allyl-phenyl) ketone obtained by transportation of 4:4'-diallyloxy-benzophenone using Claisen's method, is dissolved in a mixture of carbon disulphide (50 cc.) and chloroform (60 cc.). Bromine (11 g.) is slowly added to the solution at ambient temperature and is rapidly absorbed. The solvent is then driven off by distillation under reduced pressure. There remains as residue bis(4-acetoxy-3-dibromopropyl-phenyl) ketone in the form of a thick oil which crystallises after a few hours in an ice box. After recrystallisation from a mixture of chloroform and alcohol, it melts at 157–158° C.

To a solution of the tetrabromo ketone (18 g.) in absolute alcohol (200 cc.) there is slowly added, with heating on a water bath, a 1.2% sodium solution in absolute alcohol (100 cc.) and the mixture is then heated under reflux for one hour. The alcohol is driven off by distillation and the residue is taken up in chloroform. The sodium bromide present is filtered off, and absolute alcohol is added to the hot chloroform solution until it commences to become turbid. Bis(2-bromomethyl-5-coumaranyl ketone, melting at 135–136° C., crystallises on cooling.

The ketone thus obtained is heated for 16 hours in a sealed tube at 140° C. with an excess of piperidine and, following the same procedure as in Example II, bis(2-piperidinomethyl-5-coumaranyl) ketone is isolated. Its hydrochloride melts at about 220° C. with decomposition.

By proceeding in the same manner, but replacing piperidine by morpholine, bis(2-morpholinomethyl-5-coumaranyl) ketone, melting at 162° C. is obtained. Its hydrochloride melts at 182° C.

Of the compounds, the preparation of which is illustrated in the foregoing examples, the piperidino product of Example IV is the most interesting from a therapeutic standpoint.

I claim:

1. A compound selected from the class consisting of coumaran derivatives of the general formula:

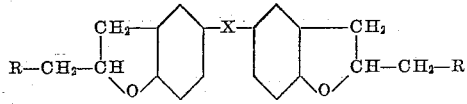

wherein X represents a member of the class consisting of a simple linkage and the following bivalent atoms and groups: O, —CH₂— and CO, and R represents a member of the class consisting of the bromine atom and the piperidino and morpholino radicals and, where R represents a piperidino or morpholino radical the acid addition salts of said compounds having therapeutically acceptable anions.

2. A compound having the structure of bis(2-piperidinomethyl-5-coumaranyl).
3. A compound having the structure of bis(2-piperidinomethyl-5-coumaranyl) ether.
4. A compound having the structure of bis(2-piperidinomethyl-5-coumaranyl) ketone.
5. Bis(2-bromomethyl-5-coumaranyl).
6. Bis(2-bromomethyl-5-coumaranyl) ketone.
7. A process for the production of coumaran derivatives which comprises the tetrabromination of compounds of the type:

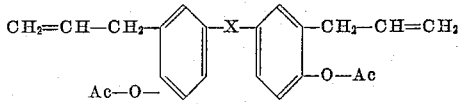

wherein X represents a member of the class consisting of a simple linkage and the following bivalent atoms and groups: O, —CH₂— and CO, and Ac represents an acetyl group, treatment of the bis(dibromopropyl) derivatives thus obtained with sodium in alcohol to hydrolyse the acetoxy groups and simultaneously to effect closing of the dihydrofuran rings.

8. A process for the production of coumaran derivatives which comprises the tetrabromination of compounds of the type:

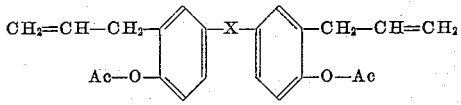

wherein X represents a member of the class consisting of a simple linkage and the following bivalent atoms and groups: O, —CH₂— and CO, and Ac represents an acetyl group, treatment of the bis(dibromopropyl) derivatives thus obtained with sodium in alcohol to hydrolyse the acetoxy groups and simultaneously to effect closing of the dihydrofuran rings and condensation of the bromomethyl coumarans thus formed with excess of piperidine to form an aminomethyl-coumaran with loss of hydrobromic acid.

9. A process for the production of coumaran derivatives which comprises the tetrabromination of compounds of the type:

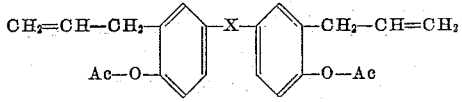

wherein X represents a member of the class consisting of a simple linkage and the following bivalent atoms and groups: O, —CH₂— and CO, and Ac represents an acetyl group, treatment of the bis(dibromopropyl) derivatives thus obtained with sodium in alcohol to hydrolyse the acetoxy groups and simultaneously to effect closing of the dihydrofuran rings and condensation of the bromomethyl coumarans thus formed with excess of morpholine to form an aminomethyl-coumaran with loss of hydrobromic acid.

No references cited.